(12) United States Patent
Barry et al.

(10) Patent No.: US 8,681,322 B2
(45) Date of Patent: Mar. 25, 2014

(54) DISTANCE MEASUREMENT USING INCOHERENT OPTICAL REFLECTOMETRY

(75) Inventors: Alexander M. Barry, Roanoke, VA (US); Roger Glen Duncan, Christiansburg, VA (US); Brooks A. Childers, Christiansburg, VA (US); Robert M. Harman, Troutville, VA (US); Daniel S. Homa, Blacksburg, VA (US); Ajit Balagopal, Christiansburg, VA (US); Philip Robin Couch, Devon (GB)

(73) Assignee: Baker Hughes Incorporated, Houston, TX (US)

( * ) Notice: Subject to any disclaimer, the term of this patent is extended or adjusted under 35 U.S.C. 154(b) by 238 days.

(21) Appl. No.: 13/271,852

(22) Filed: Oct. 12, 2011

(65) Prior Publication Data
US 2013/0094011 A1    Apr. 18, 2013

(51) Int. Cl.
*G01C 3/08* (2006.01)
(52) U.S. Cl.
USPC ............... 356/5.01; 356/3.01; 356/4.01
(58) Field of Classification Search
USPC ............ 356/3.01–3.15, 4.01–4.1, 5.01–5.15, 356/6–22, 28, 28.5
See application file for complete search history.

(56) References Cited

U.S. PATENT DOCUMENTS

| 6,396,572 | B1* | 5/2002 | Chang et al. ............... 356/35.5 |
| 6,650,810 | B1* | 11/2003 | Lieberman et al. ............ 385/37 |
| 7,453,100 | B2 | 11/2008 | Funabashi et al. |
| 2003/0095249 | A1* | 5/2003 | Ferdinand et al. ......... 356/139.1 |

OTHER PUBLICATIONS

Ryu, et al. "Incoherent Optical Frequency Domain Reflectometry for Health Monitoring of avionics Fiber Optics Networks". IEEE, Avionics, Fiber-Optics and Photonics Technology conference. Sep. 30, 2008-Oct. 2, 2008. pp. 15-16.

* cited by examiner

*Primary Examiner* — Luke Ratcliffe
(74) *Attorney, Agent, or Firm* — Cantor Colburn LLP

(57) ABSTRACT

A method for estimating a distance includes: generating an optical signal having a wavelength that is within a wavelength range, the optical signal modulated via a modulation signal having a modulation frequency; transmitting the modulated optical signal from a light source into the optical fiber, the optical fiber in contact with a moveable strain inducing element located at the position along the optical fiber, the optical fiber including a plurality of sensing locations configured to reflect light within the wavelength range when under strain from the strain inducing element and transmit light within the wavelength range when not under strain from the strain inducing element; receiving a reflected signal including light reflected from at least one of the sensing locations; demodulating the reflected signal with a reference signal to generate reflected signal data; and determining the distance to the position along the optical fiber based on the reflected signal data.

19 Claims, 5 Drawing Sheets

US 8,681,322 B2

DISTANCE MEASUREMENT USING INCOHERENT OPTICAL REFLECTOMETRY

BACKGROUND

Fiber-optic sensors have been utilized in a number of applications, and have been shown to have particular utility in sensing parameters in various environments. Optical fiber sensors can be incorporated into harsh environments such as downhole environments and be used to sense various parameters of an environment and/or the components disposed therein, such as temperature, pressure, strain and vibration.

Parameter monitoring systems can be incorporated with various components and utilized to measure strain at the component. For example, swept wavelength reflectometry techniques can be used to locate strain elements on an optical fiber sensor and accordingly locate a source of strain on the optical fiber and the component.

SUMMARY

A method for estimating a distance to a position along an optical fiber includes: generating an optical signal via a measurement unit, the optical signal having a wavelength that is within a wavelength range, the optical signal modulated via a modulation signal having a modulation frequency; transmitting the modulated optical signal from a light source into the optical fiber, the optical fiber in contact with a moveable strain inducing element located at the position along the optical fiber, the optical fiber including a plurality of sensing locations configured to reflect light within the wavelength range when under strain from the strain inducing element and transmit light within the wavelength range when not under strain from the strain inducing element; receiving a reflected signal including light reflected from at least one of the sensing locations; demodulating the reflected signal with a reference signal to generate reflected signal data; and determining the distance to the position along the optical fiber based on the reflected signal data.

A system for estimating a distance to a position along an optical fiber includes: a light source configured to generate an optical signal having a wavelength within a wavelength range; an optical fiber operably in optical communication with the light source and in contact with a moveable strain inducing element located at the position along the optical fiber, the optical fiber including a plurality of sensing locations configured to reflect light within the wavelength range when under strain from the strain inducing element and transmit light within the wavelength range when not under strain from the strain inducing element; a modulator configured to modulate the optical signal via a modulation signal having a variable modulation frequency over a period of time; a detector configured to receive a reflected signal including light reflected from at least one sensing location; and a processor configured to demodulate the reflected signal with a reference signal to generate reflected signal data, and determine the distance to the position along the optical fiber based on the reflected signal data.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

DETAILED DESCRIPTION

There are provided systems and methods for measuring level or distance that include an incoherent reflectometry measurement system. The measurement system may include features such as an optical (e.g., laser) source, a modulator and an optical fiber that includes a plurality of sensing locations (e.g., fiber Bragg gratings). A strain inducing element is disposed relative to a component or location to which a distance is desired to be measured. The strain inducing element is moveable along the optical fiber and imparts a strain on the optical fiber. The system further includes a detector and a processor for receiving reflected signals from the optical fiber and analyzing the reflected signals to determine a distance to a sensing location corresponding to the location. The system can be used in harsh, high-temperature environments such as downhole environments and may also be used as a fluid level measurement system.

Figure 1:
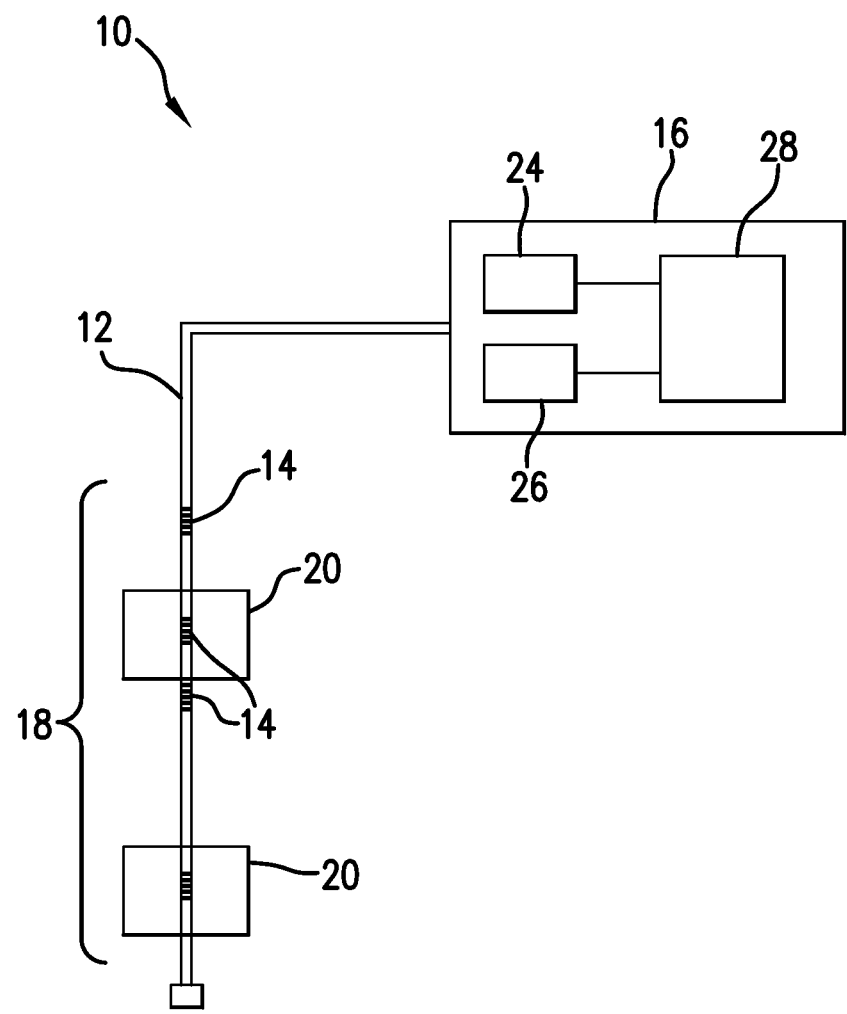
FIG. 1 illustrates an exemplary embodiment of a distance measurement system.

Referring to FIG. 1, an exemplary embodiment of an optical strain sensing system 10 is shown. The system includes an optical fiber 12 having one or more sensing locations 14 disposed along a length of the optical fiber 12. The sensing locations 14 are configured to reflect and/or scatter optical interrogation signals launched into the optical fiber by a measurement unit 16. The reflected and/or backscattered signals are referred to herein collectively as "reflected signals" or "return signals". In the embodiment shown in FIG. 1, the sensing locations 14 are fiber Bragg gratings (FBG). Other sensing devices or elements may be used, such as mirrors, Fabry-Perot cavities and intrinsic scattering features. Types of intrinsic scattering include Rayleigh scattering, Brillouin scattering and Raman scattering. The optical fiber 12 may be fabricated with discrete or continuous gratings. The optical fiber 12 may also include a sensing region 18, i.e., any length of the optical fiber 12 along which distance measurements are desired to be taken. For example, the sensing region 18 is a length of the optical fiber 12 that is disposed along a length of a borehole in an earth formation, or a length of the optical fiber that is disposed along a depth of a fluid container (i.e., generally perpendicular to a plane of a fluid surface). The optical fiber 12 may be configured as a cable that includes one or more optical fibers and/or other components such as strength members, protective jackets and electrical conductors.

One or more strain inducing elements 20 are disposed along the optical fiber 12 and configured to apply a strain to the optical fiber 12 at some location. In one embodiment, a strain sensing element 20 is disposed along the optical fiber and is connected to or otherwise associated with a component or location having a distance from the measurement unit 16 that is desired to be measured. For example, the strain inducing element 20 is movable relative to the optical fiber 12 (e.g., moveable along an axis of the optical fiber 12) and is disposed in a fixed position along the optical fiber 12 relative to a component or a desired location. The location may be any location that is desired to be measured. Examples of such locations include one or more locations of a downhole component, a surface of fluid in a tank or any other location that is desired to be measured.

The measurement unit 16 is disposed at an end of the optical fiber 12 and includes an optical interrogator connected in operable communication with the optical fiber 12. The measurement unit 16 includes, for example, an electromagnetic signal or optical source 24 such as a LED and/or a laser, and a signal detector 26. The optical source 24 may be a single wavelength source. In one embodiment, a processing unit 28 is in operable communication with the signal source 24 and the detector 26 and is configured to control the source 24, receive reflected signal data from the detector 26 and/or process reflected signal data. The processing unit 28 may include any suitable hardware and/or software, such as an electronic instrumentation unit (e.g., a surface instrument unit (SIU) for generating excitation and/or modulation signals and processing return signals from the optical fiber 12. The measurement system 10 may be used in conjunction with any surface or downhole environment, particularly those requiring distance measurements within a harsh environment, such as a high temperature environment, or an environment that is not conducive to electronics.

In one embodiment, the measurement system is configured as an optical frequency-domain reflectometry (OFDR) system. In this embodiment, the source 24 includes a laser that is used to spectrally interrogate the optical fiber 12. Scattered signals reflected from intrinsic scattering locations, sensing locations 14 and other reflecting surfaces in the optical fiber 12 may be detected, demodulated, and analyzed. Each scattered signal can be correlated with a location by, for example, a mathematical transform or interferometrically analyzing the scattered signals in comparison with a selected common reflection location. Each scattered signal can be integrated to reconstruct the total length and/or shape of the cable.

Figure 2:
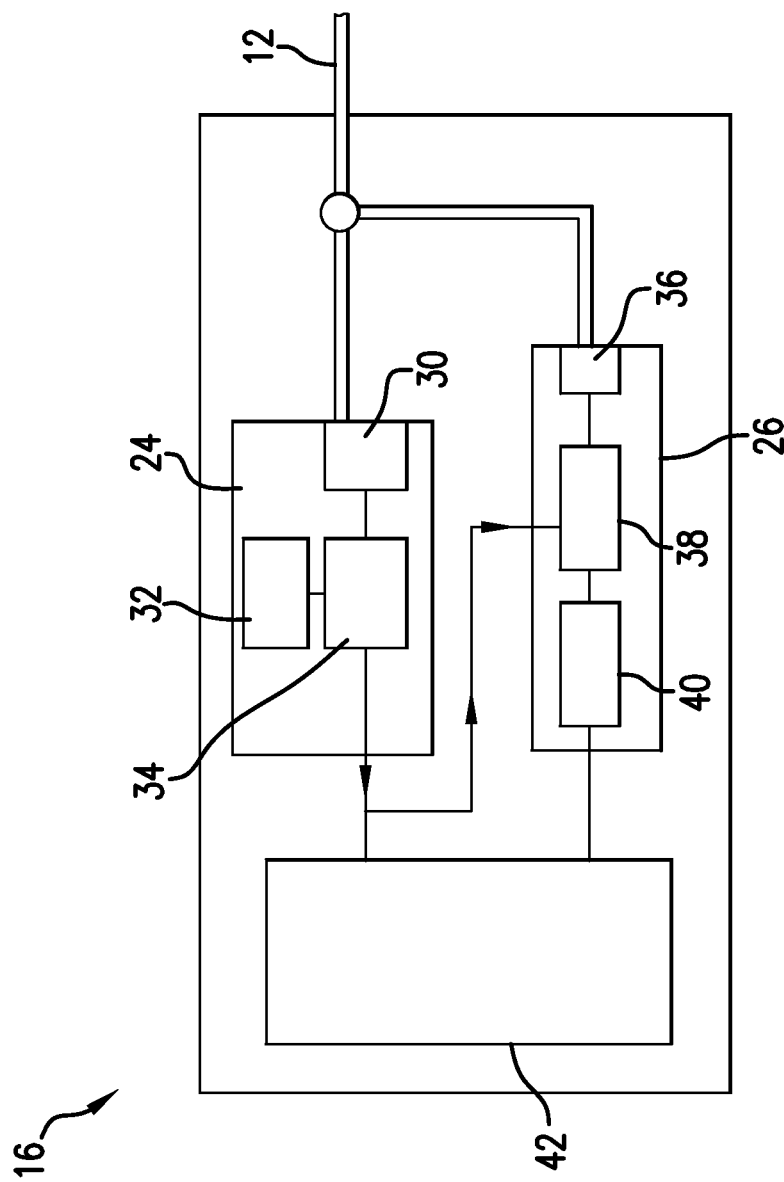
FIG. 2 illustrates an exemplary embodiment of a measurement unit of the system of FIG. 1.

An example of the measurement unit 16 is shown in FIG. 2. In this example, the measurement unit is an OFDR device. The measurement unit 16 includes the optical source 24, such as a continuous wave (cw) single frequency (or wavelength) or tunable diode laser optically connected to the optical fiber 12. The optical source 24 includes, for example, a laser 30, a signal generator 32 and an optical modulator 34. In one embodiment, the laser only needs to emit light having a single wavelength.

The signal generator 32, such as a sweep generator, is configured to generate an electric modulation signal. An example of a sweep generator is a DDS (direct digital synthesis) integrated circuit. The modulation signal is generally an oscillating waveform, such as a sine wave, having an oscillation frequency referred to herein as a "modulation frequency". The sweep generator generates a swept or "chirped" waveform (e.g., sinusoid) having a modulation frequency that is swept or varied over time. For example, the sweep generator generates a signal having a modulation frequency that varies from 200 MHz to 400 MHz. The modulation signal drives the optical modulator 34, producing an amplitude modulated optical signal.

The modulator (e.g., function generator) 34 is in communication with the laser 30 and modulates the laser 30 by power, intensity or amplitude, using the modulation signal. A detector 26 is included to detect reflected signals from the optical fiber 12 in response to the modulated optical signal launched from the optical source 24.

The detector 26 is configured to detect return signals, and may also be configured to process the return signals for analysis. In one embodiment, the detector 26 includes a sensor 36 such as a photodiode, a mixer 38, and an analog to digital (AD) converter 40. The detector 36 transmits an analog signal to the mixer 38, which is configured to mix or demodulate the analog signal using a de-modulation or reference signal, such as the modulation signal used in launching the optical interrogation signal. The mixer 38 mixes the signals by, for example, mixing the reference and reflected signals and demodulating the amplitude and phase of the reflected signal. For example, the output signal of the photodiode may be mixed with the modulation signal from the sweep generator 32. The output from the mixer 38 (i.e., the demodulated or mixed signal) may be input to the AD converter 40 and subsequently to a computer processor 42.

Still referring to FIG. 2, the processor 42 is coupled to at least the detector 26, and is configured to process the reflected light signals. The processor 42 may be implemented using a central processing unit (CPU), a microcontroller, a digital signal processor (DSP), or some other programmable device. The processor 42 may be configured to further process the demodulated signal. For example, the processor 42 is configured to transform the reflected signal to allow spatial correlation of the signal with sensing locations 14, such as by performing a fast Fourier transform (FFT) on the reflected signals. In one embodiment, the processor 42 is configured to perform a Fourier transform on the digitized mixer output. The result includes a peak at the sensing location 14 corresponding to the location of the strain inducing element 20. The peak can be correlated with a distance to the location of the strain inducing element 20. The processor 42 may also perform some curve fitting and/or peak detection algorithms to compute the distance to the strain element.

The processor 42 can be standalone or incorporated into the measurement unit 16. Various additional components may also be included as part of the measurement unit 16, such as a spectrum analyzer, beam splitter, light circulator, gain meter, phase meter, lens, filter and fiber optic coupler for example. It is noted that the various components for exciting, modulating, detecting and processing are not limited to the configurations described herein. For example, components such as the sweep generator 32, the optical modulator 34, the mixer 38 and the AD converter 40 can be configured as separate components or be incorporated into other processors or circuits, such as the processor 42.

Figure 3:
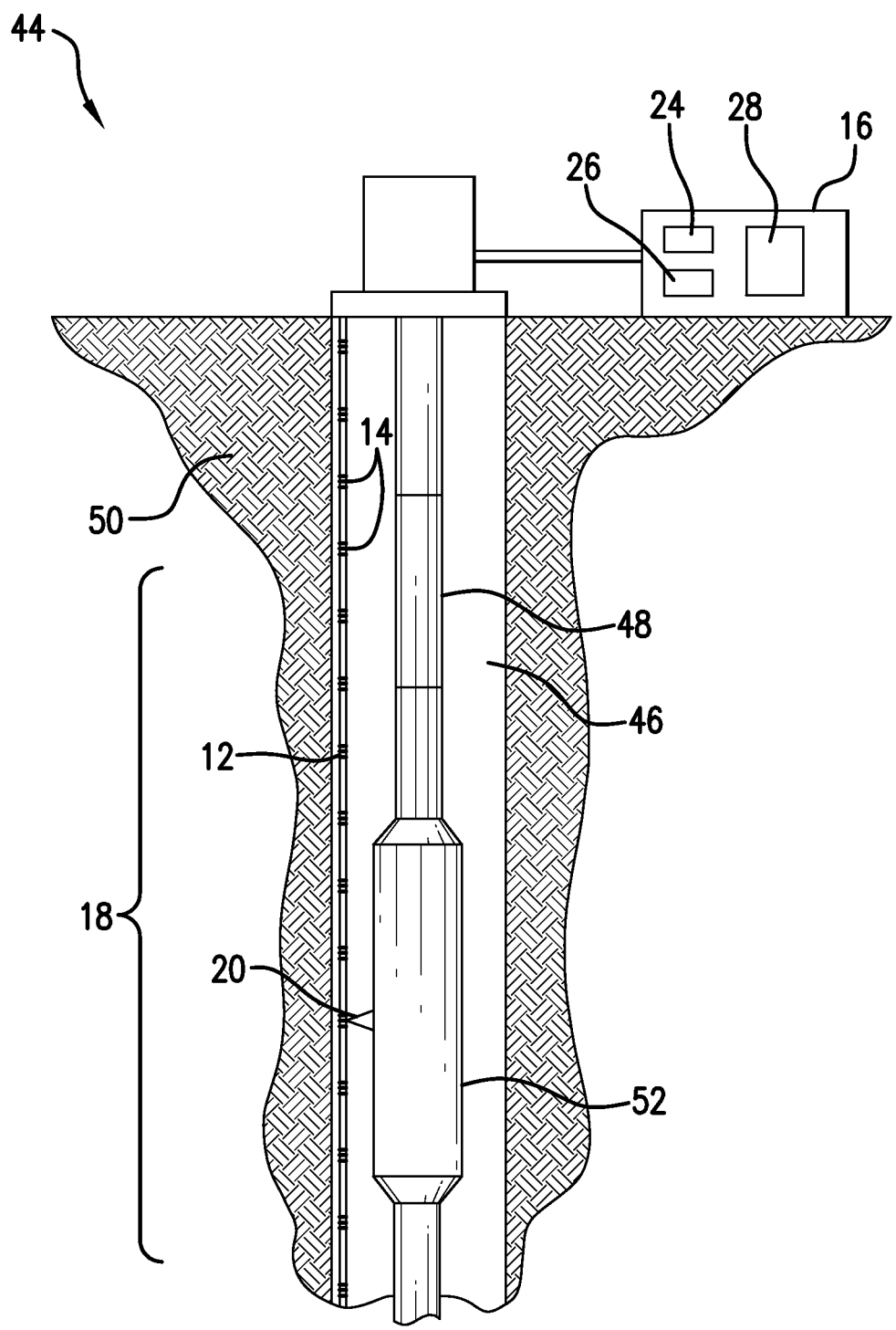
FIG. 3 illustrates an exemplary embodiment of a downhole drilling, monitoring, evaluation, exploration and/or production system that includes the distance measurement system of FIG. 1.
Figure 4:
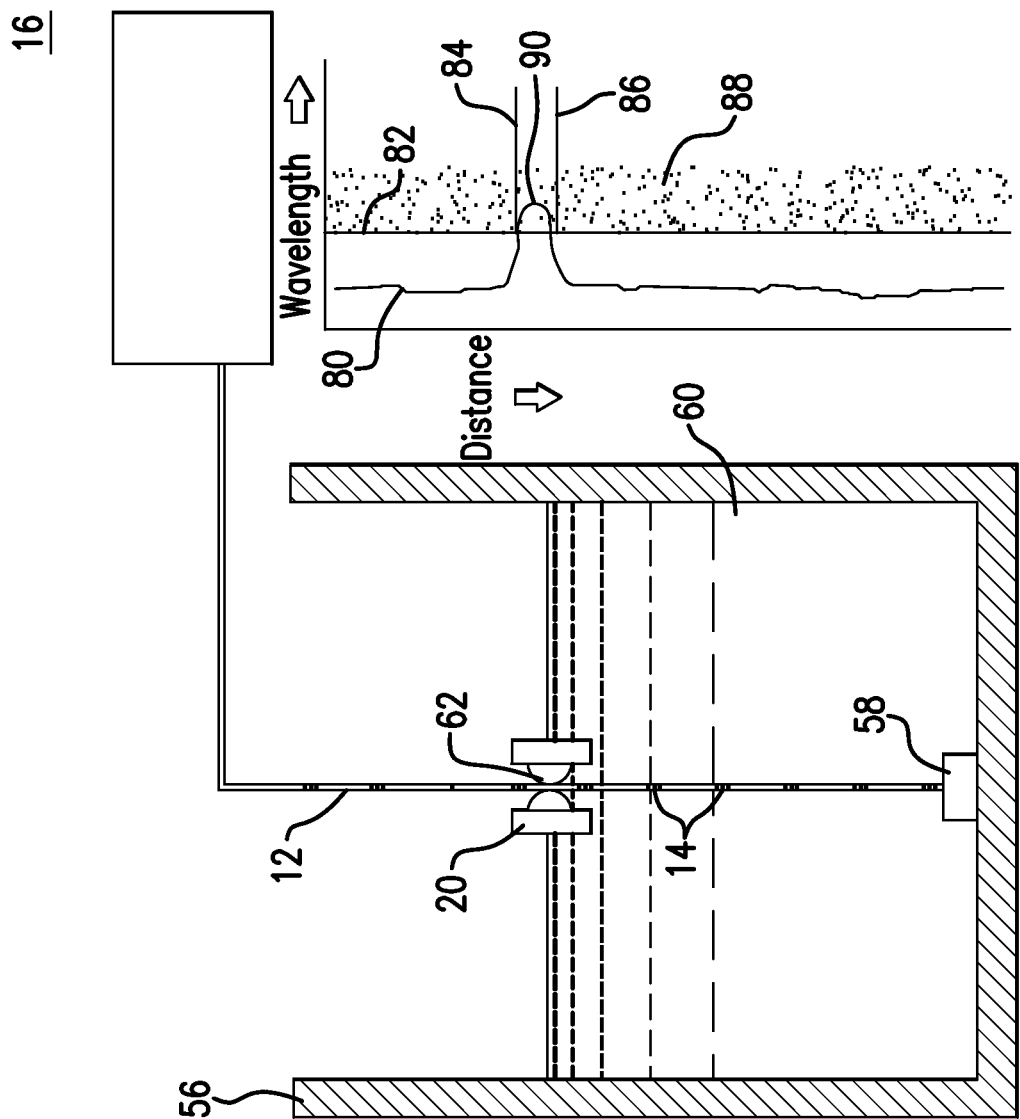
FIG. 4 Illustrates an exemplary embodiment of a fluid level measurement system that includes the distance measurement system of FIG. 1.
Figure 5:
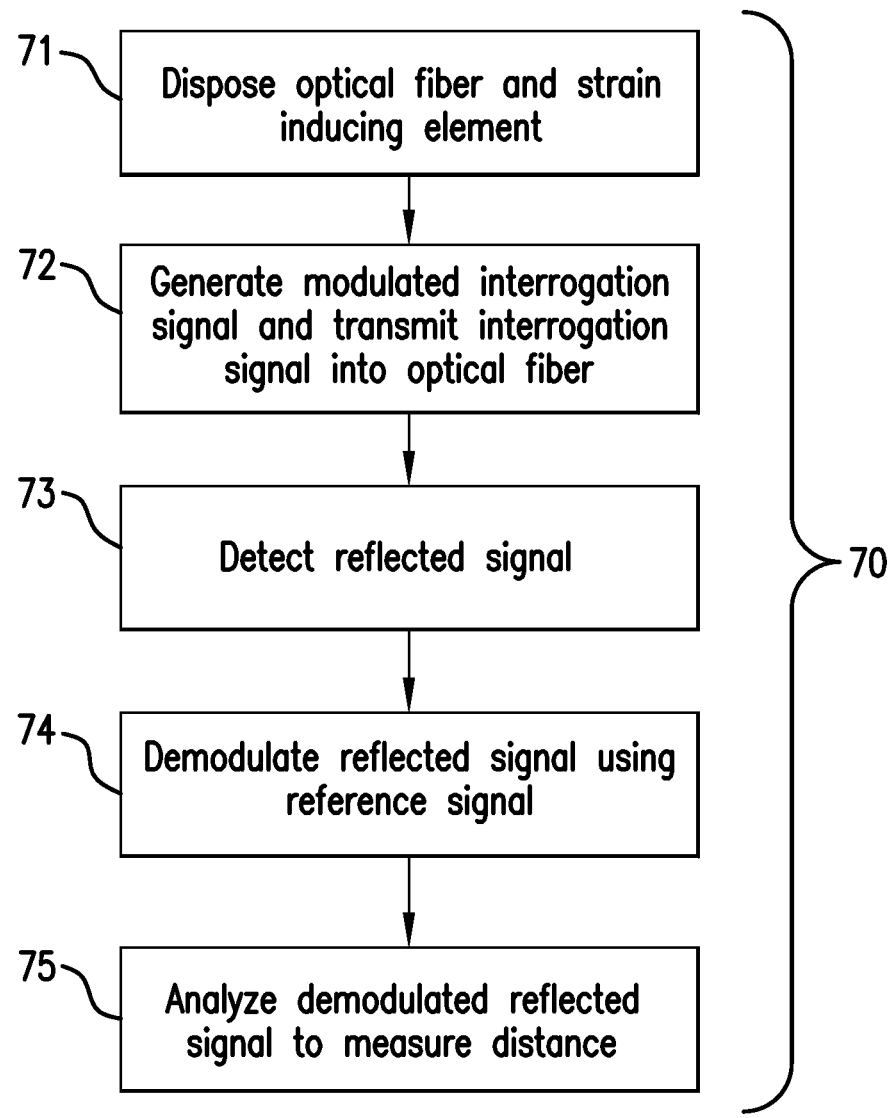
FIG. 5 is a flow chart illustrating an exemplary embodiment of a method of measuring a distance to a position along an optical fiber.

FIGS. 3 and 4 illustrate exemplary applications of the system 10. Referring to FIG. 3, an exemplary embodiment of a downhole drilling, monitoring, evaluation, exploration and/or production system 44 disposed in a wellbore 46 is shown. A borehole string 48 is disposed in the wellbore 46, which penetrates at least one earth formation 50 for performing functions such as extracting matter from the formation and/or making measurements of properties of the formation 50 and/or the wellbore 46 downhole. The system 44 and/or the borehole string 48 includes any number of downhole tools 52 for various processes including drilling, hydrocarbon production, and formation evaluation (FE) for measuring one or more physical quantities in or around a borehole. Various measurement tools 18 may be incorporated into the system 10 to affect measurement regimes such as wireline measurement applications or logging-while-drilling (LWD) applications.

The measurement system 10 is incorporated into the downhole system 44. The measurement unit 16 is located, for example, at a surface location. The optical fiber 12 is operably connected to the measurement unit 16 and is configured to be disposed downhole. In this example, the optical fiber is fixedly attached to a borehole casing or otherwise disposed in the borehole 46 independently of the component whose distance is to be measured. A downhole component such as the tool 52 includes a strain inducing element 20 attached to or otherwise fixedly disposed with the tool 52. For example, the strain inducing element may be configured as a protrusion, a piston, an extendable member such as a stabilizer or any other mechanism that can apply a force to the optical fiber. Multiple strain inducing elements 20 may be included as desired to track the position of different components.

FIG. 4 illustrates an embodiment of the measurement system 10, in which the system 10 is configured as a fluid level measurement system. The optical fiber 12 is disposed within a tank 56 or other fluid container. The optical fiber may be affixed to the bottom of the tank or otherwise held in a fixed relationship with the tank by, for example, a weight 58. The strain inducing element 20, in this embodiment, is a floating member disposed axially with the optical fiber 12 (e.g., as a ring or member with a hole therethrough). The strain inducing element 20 moves axially along the optical fiber 12 with the surface level of fluid 60 in the tank 56. One or more contact members 62 are attached to the strain inducing member and contact the optical fiber 12 to exert a force on the optical fiber 12 and cause the optical fiber 12 to deform (e.g., bend or compress). In response to this deformation, the FBG or other sensing location 14 reflects the optical signal and causes a resultant peak in the return signal that can be correlated to a location along the optical fiber 12. In this way, the fluid level in the fluid container can be measured.

Any number of strain inducing elements 20 may be disposed on the optical fiber 12. For example, the measurement system of FIG. 4 may include multiple strain sensing elements configured to correspond to multiple fluids. One embodiment includes a strain sensing element 20 corresponding to each of multiple different fluids (e.g., oil and water) in the same tank 56. Each strain sensing element can be configured to float at a different level in the tank, e.g., by selecting a buoyancy or density for each element. For example, the density of a first float or strain inducing element 20 is configured to float at a level of an interface between oil and water, and a second element is configured to float at the surface of the oil.

FIG. 3 illustrates a method 70 of measuring distance. The method 70 includes one or more stages 71-75. Although the method 70 is described in conjunction with the measurement system described above, the method 70 is not limited to use with these embodiments, and may be performed by the measurement unit 16 or other processing and/or signal detection device. In one embodiment, the method 70 includes the execution of all of stages 71-75 in the order described. However, certain stages may be omitted, stages may be added, or the order of the stages changed.

In the first stage 71, the optical fiber 12 and strain inducing element 20 are disposed in an environment in which distance is to be measured. In one embodiment, the strain inducing element 20 is attached to or otherwise fixedly disposed with a component such as a borehole string or a downhole tool. In another embodiment, the strain inducing element 20 is disposed and is movable to correspond to a desired location. For example, the strain inducing element 20 is a floating device that maintains the element at a surface of a fluid container.

In the second stage 72, a modulated optical signal having a wavelength is generated and launched into the optical fiber 22. In one embodiment, the modulator 34 modulates the power, intensity and/or amplitude of the optical signal according to a sinusoidal or other oscillating function having a time-varying modulation frequency. In general, the modulation frequencies are in the radio frequency range, although other frequencies can be used down to zero Hertz. The frequency of modulation is swept, i.e., changed, by the modulator 34 over a period of time, such as in a step-wise change, a continuous or nearly continuous change (e.g., linear change, exponential). For example, the modulator 34 modulates the optical signal with a modulation signal having a modulation frequency represented by a linear function.

The optical signal is transmitted into the optical fiber 12. In one embodiment, the wavelength of the optical signal is at least substantially constant and is selected so that each sensing location 14 at least substantially transmits the optical signal when the strain inducing element 20 is not acting on the sensing location, and at least partially reflects the optical signal when the optical fiber is under strain from the strain inducing element 20 at the sensing location 14. For example, the wavelength of the optical source is selected so that it lies between the central wavelength of FBGs in the optical fiber 12 at rest (i.e., not under strain from the element 20) and the central wavelength of the FBGs when under strain from the strain inducing element 20. The light from the source will thus not be substantially reflected by the fiber at rest, but will be reflected by corresponding FBGs when affected by the strain inducing element 20. In other examples, the wavelength is selected to be at or near the central wavelength when under strain, or at least closer to the central wavelength when under strain than to the central wavelength when at rest. Thus, the sensing location(s) 14 at the optical fiber 12 where the strain sensing element 20 is located will reflect the optical signal sufficiently to generate a peak in the resulting data.

In another embodiment, the optical signal is power, intensity and/or amplitude modulated, and the wavelength is varied over time or swept, for example, in a step-wise or continuous manner. When the sensing location 14 is at rest, wavelengths at or around a first central wavelength (the central wavelength of the sensing location 14 at rest) are reflected back to the detector. When the sensing location 14 is under strain, wavelengths at or around a second central wavelength (the central wavelength of the sensing location 14 when strained) are reflected. In one embodiment, the wavelength of the optical signal is restricted to a range that includes wavelengths reflected when under strain (i.e., within a selected range around the second central wavelength), so that only sensing locations 14 under strain reflect the optical signal.

In the third stage 73, a reflected signal is detected by the detector 26 and corresponding reflected signal data is generated by the processor 26. The reflected signals may include light reflected and/or backscattered from sensing locations 14. For example, the reflected signal is a result of reflections and/or backscattering from FBGs arrayed along the optical fiber 12.

Because the frequency of the modulation is swept (i.e., changed), the input light and the resulting reflected signals are formed from wave inputs and, thus, can be considered to be in an optical frequency domain. In general, the amplitude and phase of the resultant signals are measured as a function of the modulation frequency.

In the fourth stage 74, the reflected signal is mixed or demodulated with respect to a reference signal. In one embodiment, the reference signal is the same as or similar to the modulation signal used to modulate the optical signal launched into the fiber.

In one embodiment, the reflected signal is demodulated or mixed, e.g., by measuring the amplitude and/or phase of the reflected signal with respect to the reference signal. The demodulation is performed over the time period of the modulated optical signal. This demodulation or mixing operation can be performed by any suitable electronic mixing device, such as a scalar network analyzer for measuring amplitude or a vector network analyzer for measuring amplitude and phase.

For example, the output signal of the photodiode 36 is mixed with the chirped modulation signal from the sweep generator 32. The output from the mixer 38 is digitized and fed to the processor 40. The processor 40 performs a Fourier transform on the digitized mixer output, and the resulting data includes a peak at the location of the strain inducing element 20. In one embodiment, if the system 10 includes multiple strain inducing elements, the data may include multiple peaks at the locations of the elements. The processor 40 may also further process the resulting data (e.g., perform some curve fitting and peak detection algorithm) to compute the distance to the strain element 20.

Exemplary interrogation optical signals and reflected signals are illustrated in FIG. 4. Although these examples are discussed in conjunction with the fluid level measurement system, they could be used with any optical fiber distance measurement system. In the following examples, the optical fiber includes an array of sensing locations 14 disposed along the optical fiber length.

Curve 80 illustrates the central wavelength of each sensing location along the optical fiber 12. As shown by curve 80, the central wavelength is substantially constant around a central wavelength when at rest. As the sensing locations approach the location of the strain inducing member, the central wavelength increases as successive sensing locations experience increasing strain, until reaching a maximum at a location of a strain sensing element(s) in contact with the member(s) 62.

In one example, the optical signal wavelength is held substantially constant at a level shown by line 82. Reflected signals 84 and 86 corresponding to locations where the optical signal wavelength meets the central wavelength are detected and may be correlated with distance. The distance of the strain inducing member 20 can be determined by, e.g., taking an average of the locations of signals 84 and 86.

In another example, the optical signal wavelength is varied or swept through a wavelength range shown by region 88. As the central wavelength 80 increases near the strain inducing element 20, the central wavelength enters the wavelength range shown by region 88. This group of signals (shown by curve section 90) are detected and a corresponding bump or gradual peak can be analyzed to determine the location of the strain inducing member 20, e.g., by processing the curve 90 to identify a maximum.

In the fifth stage 75, the reflected signal data is utilized to measure a distance of a component or other desired location along the optical fiber. For example, the reflected signal data is analyzed to identify one or more peaks, which correspond to a location on the fiber at which the strain inducing element 20 is located. In one embodiment, a plurality of strain inducing elements 20 may be disposed at a component or relative to a desired region, and the reflected signal data is correlated to locations of sensing regions 14. In addition, the reflected signal data may be analyzed to estimate various parameters, such as temperature, pressure, vibration, strain and deformation of downhole components, chemical composition of downhole fluids or the formation, acoustic events, and others.

For example, for methods that include interrogating with a constant wavelength that is between the central wavelength at rest and the central wavelength under strain, two peaks are identified when the central wavelength of the sensing location 14 meets the optical signal wavelength. These peaks may be analyzed, e.g., by taking an average of their positions, to determine the location of the strain inducing member 20.

In another example, for methods that include interrogating with a swept wavelength optical signal, more gradual peak or bump can be identified. This bump can be analyzed to identify a maximum and correlate the maximum with the location of the strain inducing member 20.

The methods and systems described herein are not limited to using Bragg gratings. Other sensing elements or devices may also be used, such as Rayleigh scattering, Raman scattering, and/or Brillouin scattering. For example, if the sensing locations 14 include Rayleigh scattering elements, the reflected signal is processed via a coherent OFDR system. Rayleigh scatter can be considered to behave like a random Bragg grating. Thus, peak patterns can be identified by comparing the patterns to known patterns indicative of strain on the fiber. The location of such patterns can be correlated to a location of the strain inducing element. In one embodiment, Raylerigh scattering data is generated for multiple measurements (i.e., multiple interrogation signals), and noise or other peak patterns that look at least substantially the same over these measurements can be identified as corresponding to strain for location of the strain inducing element 20. In one embodiment, for measurements that utilize Raman scattering (e.g., via a Raman-based distributed temperature sensing (DTS) system), temperature gradients can be identified and used to locate strain. Such temperature gradients can be identified by comparing to known gradients or by comparing the magnitude of a temperature gradient relative to other regions of the optical fiber 12.

The systems and methods described herein provide various advantages over prior art techniques. The systems and methods provide a relatively simple and inexpensive system for measuring distance. Because the sensing element is exclusively incorporated in an optical fiber and does not require any electronics to be located at or near the location to be measured, the system can operate in extremely harsh conditions (e.g., high temperatures and is intrinsically safe. In addition, the light source need only be a single wavelength source, and thus very inexpensive light sources may be used.

The systems and method also require less processing power and storage relative to prior art swept wavelength techniques. Regarding fluid monitoring, conventional electronic fluid level monitoring devices use electronics disposed within a fluid container, which requires additional design to make the electronics safe for use. The techniques described herein do not require such additional design, and are thus easier to manufacture.

In support of the teachings herein, various analysis components may be used, including a digital and/or an analog system. Components of the system, such as the measurement unit 16, the processor 28 and other components of the system 10, may have components such as a processor, storage media, memory, input, output, communications link, user interfaces, software programs, signal processors (digital or analog) and other such components (such as resistors, capacitors, inductors and others) to provide for operation and analyses of the apparatus and methods disclosed herein in any of several manners well appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

It will be recognized that the various components or technologies may provide certain necessary or beneficial functionality or features. Accordingly, these functions and features as may be needed in support of the appended claims and variations thereof are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for estimating a distance to a position along an optical fiber, the method comprising:
    generating an optical signal via a measurement unit, the optical signal having a wavelength that is within a wavelength range, the optical signal modulated via a modulation signal having a modulation frequency;
    transmitting the modulated optical signal from a light source into the optical fiber, the optical fiber in contact with a moveable strain inducing element located at the position along the optical fiber, the optical fiber including a plurality of sensing locations configured to reflect light within the wavelength range when under strain from the strain inducing element and transmit light within the wavelength range when not under strain from the strain inducing element;
    receiving a reflected signal including light reflected from at least one of the sensing locations;
    demodulating the reflected signal with a reference signal to generate reflected signal data, and transforming the reflected signal data from a frequency domain into a spatial domain to provide a measurement set corresponding to a length of the optical fiber; and
    determining the distance to the position along the optical fiber based on the reflected signal data, wherein determining the distance includes identifying a peak in the transformed reflected signal data.

2. The method of claim 1, wherein the modulation signal has a variable modulation frequency over a period of time.

3. The method of claim 2, wherein the wavelength of the optical signal is substantially constant over the period of time.

4. The method of claim 1, wherein the reference signal has at least substantially the same form as the modulation signal.

5. The method of claim 1, further comprising disposing the optical fiber in a borehole in an earth formation and attaching the strain inducing element to a downhole component, wherein the position along the optical fiber corresponds to a location of the downhole component in the borehole.

6. The method of claim 1, further comprising disposing the optical fiber in a fluid tank, wherein the strain inducing element is disposed at a surface of fluid within the tank and configured to move in response to changes in the surface level.

7. The method of claim 6, wherein the strain inducing element is a floating element disposed about the optical fiber and moveable along the optical fiber.

8. The method of claim 1, wherein the plurality of sensing elements is a plurality of fiber Bragg gratings, each fiber Bragg grating having a first central wavelength when under strain from the strain inducing element and a second central wavelength when not under strain from the strain inducing element, the optical signal wavelength being between the first central wavelength and the second central wavelength.

9. The method of claim 8, wherein the optical signal wavelength is at least substantially constant, and the reflected signal includes a pair of peaks corresponding to locations where a central wavelength of a fiber Bragg grating meets the optical signal wavelength.

10. The method of claim 8, wherein the optical signal wavelength is varied within a wavelength range between the first central wavelength and the second central wavelength, and the reflected signal includes a curve corresponding to fiber Bragg gratings that reflect wavelengths within the wavelength range.

11. The method of claim 1, wherein transforming includes applying a Fast Fourier Transform to the demodulated reflected signal.

12. A system for estimating a distance to a position along an optical fiber, the system comprising:
    an optical fiber operably in optical communication with the light source and in contact with a moveable strain inducing element located at the position along the optical fiber, the optical fiber including a plurality of sensing locations configured to reflect light within the wavelength range when under strain from the strain inducing element and transmit light within the wavelength range when not under strain from the strain inducing element, the plurality of sensing locations including a plurality of fiber Bragg gratings, each fiber Bragg grating having a first central wavelength when under strain from the strain inducing element and a second central wavelength when not under strain from the strain inducing element;
    a light source in optical communication with the optical fiber, the light source configured to generate an optical signal having a wavelength between the first central wavelength and the second central wavelength, wherein the optical signal wavelength is varied within a wavelength range between the first central wavelength and the second central wavelength;
    a modulator configured to modulate the optical signal via a modulation signal having a variable modulation frequency over a period of time;
    a detector configured to receive a reflected signal including light reflected from at least one sensing location, the reflected signal including a curve corresponding to fiber Bragg gratings that reflect wavelengths within the wavelength range; and
    a processor configured to demodulate the reflected signal with a reference signal to generate reflected signal data, and determine the distance to the position along the optical fiber based on the reflected signal data.

13. The system of claim 12, wherein the modulation signal has a variable modulation frequency over a period of time.

14. The system of claim 13, wherein the wavelength of the optical signal is substantially constant over the period of time.

15. The system of claim 12, wherein the processor is configured to transform the reflected signal data from a frequency domain into a spatial domain to provide a measurement set corresponding to a length of the optical fiber, and determine the distance by identifying a peak in the transformed reflected signal data.

16. The system of claim 12, wherein the optical fiber is configured to be disposed in a fluid tank, and the strain inducing element is configured to be disposed at a surface of fluid within the tank and to move in response to changes in the surface level.

17. The system of claim 16, further comprising at least one additional strain inducing element, wherein the fluid tank includes a first fluid and a second fluid, the strain inducing element configured to be disposed at a surface of the first fluid and the additional strain inducing element configured to be disposed at a surface of the second fluid.

18. The system of claim 12, wherein the optical signal wavelength is at least substantially constant, and the reflected signal includes a pair of peaks corresponding to locations where a central wavelength of a fiber Bragg grating meets the optical signal wavelength.

19. A system for estimating a distance to a position along an optical fiber, the system comprising:
 a light source configured to generate an optical signal having a wavelength within a wavelength range;
 an optical fiber operably in optical communication with the light source and configured to be disposed in a fluid tank, the optical fiber in contact with a moveable strain inducing element located at the position along the optical fiber, the strain inducing element configured to be disposed at a surface of fluid within the tank and to move in response to changes in the surface level, the optical fiber including a plurality of sensing locations configured to reflect light within the wavelength range when under strain from the strain inducing element and transmit light within the wavelength range when not under strain from the strain inducing element;
 a modulator configured to modulate the optical signal via a modulation signal having a variable modulation frequency over a period of time;
 a detector configured to receive a reflected signal including light reflected from at least one sensing location; and
 a processor configured to demodulate the reflected signal with a reference signal to generate reflected signal data, and determine the distance to the position along the optical fiber based on the reflected signal data.

* * * * *